Patented June 23, 1925.

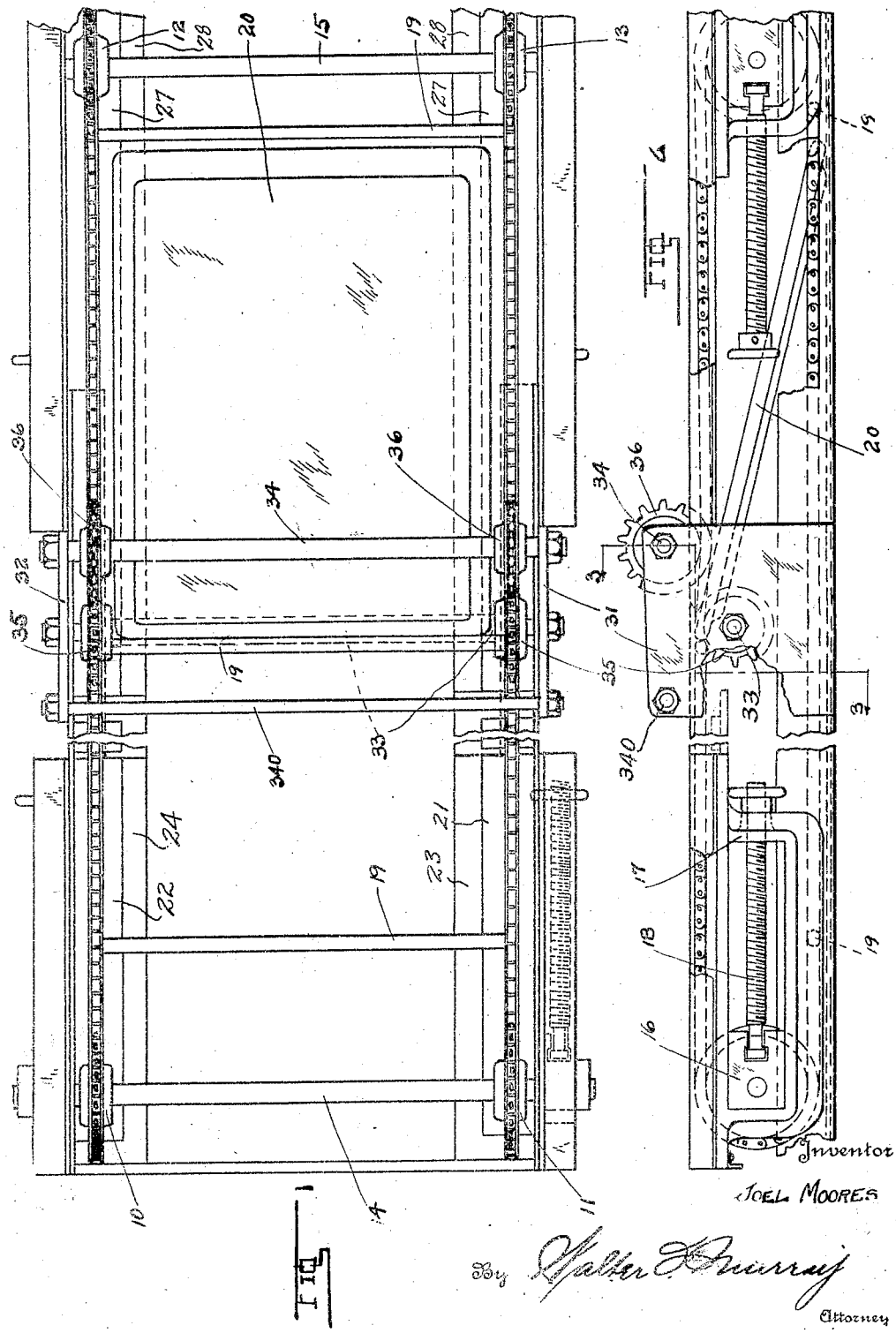

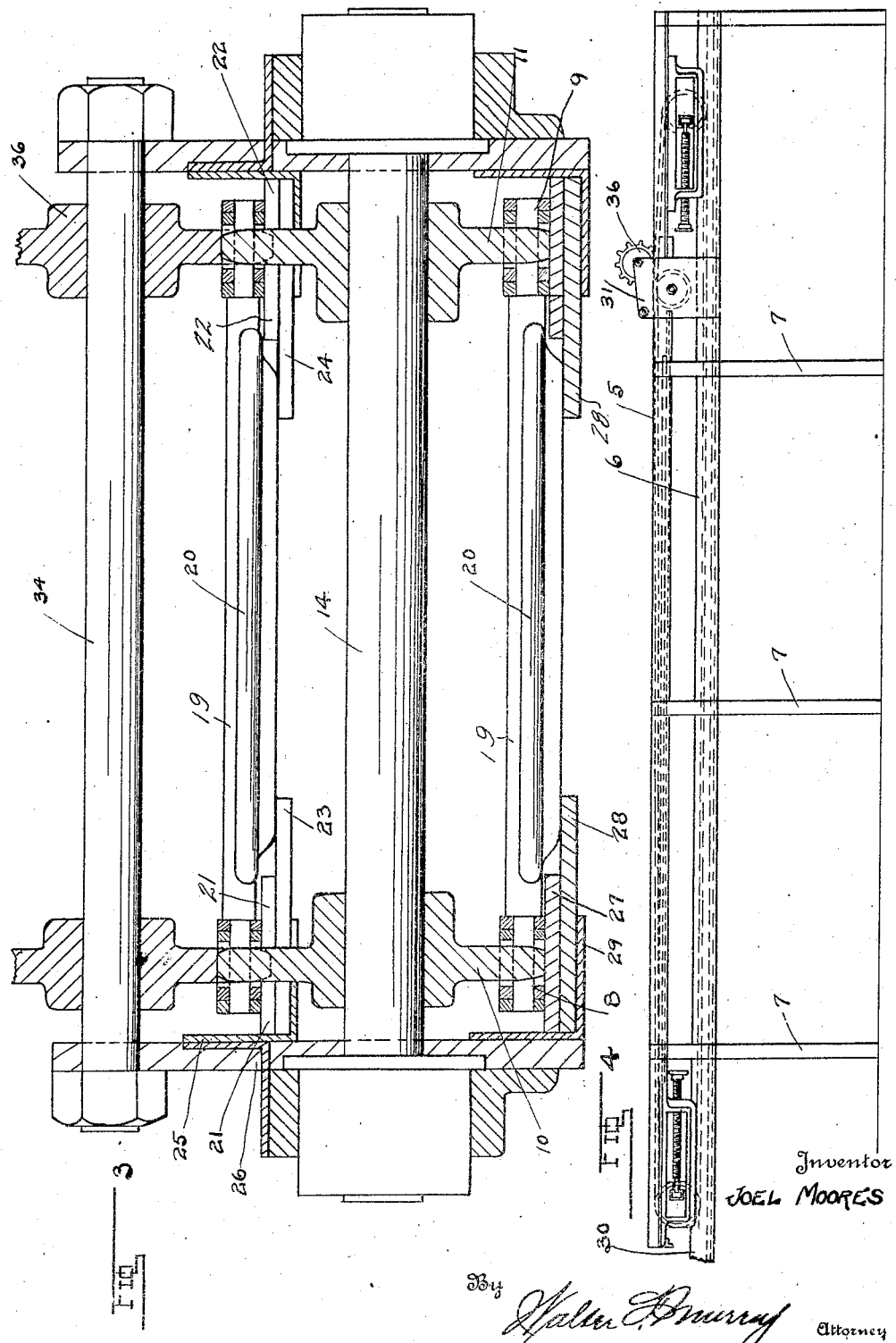

1,542,903

UNITED STATES PATENT OFFICE.

JOEL MOORES, OF CINCINNATI, OHIO, ASSIGNOR TO THE J. H. DAY COMPANY, OF CINCINNATI, OHIO, A CORPORATION OF OHIO.

PAN CONVEYER.

Application filed December 11, 1922. Serial No. 606,069.

*To all whom it may concern:*

Be it known that I, JOEL MOORES, a citizen of the United States of America, and a resident of Cincinnati, in the county of Hamilton and State of Ohio, have invented a new and useful Improvement in a Pan Conveyer, of which the following is a specification.

In cracker factories and the like, it is customary to carry or move pans or trays containing baked articles over conveyers, attendants removing the articles from the moving trays. It has been necessary in devices of this nature that an attendant be disposed at both ends of the carrying means.

An object of my invention is to provide a device adapted to eliminate one of these attendants.

Another object of my invention is to provide a device adapted to return the trays to a given place after the articles have been removed from the trays.

Another object of my invention is to provide a simple and efficient device for the purposes stated.

These and other objects are attained by means described herein and disclosed in the accompanying drawings, in which:

Fig. 1 is a fragmental plan view of a device embodying my invention.

Fig. 2 is a fragmental side elevation of the device shown in Fig. 1.

Fig. 3 is a sectional view on line 3—3 of Fig. 2.

Fig. 4 is a side elevation of a mechanism embodying my invention.

The device of my invention comprises an upper deck 5 and a lower deck 6 supported on suitable uprights or standards 7, whereby a table-like structure is attained. A pair of endless chains 8 and 9 extend about sprockets 10, 11, 12 and 13 mounted on shafts 14 and 15 carried by the decks 5 and 6. The shafts 14 and 15 are adjustable longitudinally of the decks by any suitable means such as the bearing blocks 16 slidably carried by the brackets 17 and engaged by the screws 18 adjustable thru suitable threaded bores in the brackets. The chains carry spaced transversely extending cross-bars 19 adapted to engage the pans or trays 20. The upper deck comprises rails or tracks 21 and 22 supporting the endless chains, and support plates 23 and 24 adapted to support the pans 20. The rails 21 and support plates 23 are carried by suitable angle bars 25 mounted on the frame 26 of the device. The lower deck comprises a similar structure of rails 27 and support plates 28 carried by suitable angle bars 29. The support plates 23 and 24 of the upper deck terminate intermediate the ends of the lower deck. When the pans or trays reach the ends of the upper pan supports, the pans are discharged upon the lower pan supports 28, and the endless chains and cross bars reverse the line of movement of the pans, carrying the pans to the forward end 30 of the device.

Adjacent the rear ends of the upper pan support plates 23 and 24, the decks carry upwardly extending plates 31 and 32, between which plates extend transverse rollers or shafts 33, 34 and 340. The rollers 33 and 34 carry sprockets 35 and 36 that engage the upper portion of the endless chains. The sprockets 35 and 36 bear such relation that as the chains move from sprocket 35 to sprocket 36, the chains are inclined slightly, as shown in Fig. 2, whereby to retain the cross bars in engagement upon the pans for moving the pans over the roller 33 and causing the pans to fall upon the lower deck 6. The roller 33 is disposed somewhat rearwardly of the rear end of the upper pan supports 23 and 24 and has its upper edge in substantial horizontal alignment with the upper edges of the pan supports 23 and 24 wherefore when the pans are moved rearwardly of the device by the chains, the pans must pass over the roller 33. The roller 34 is disposed above the chains and to the rear of the roller 33. The lower surfaces of the sprockets 36 are disposed slightly below the plane in which the upper edges of the pans are disposed when moving rearwardly over the upper deck, wherefor the cross bars 19 are lowered slightly and engage the pans until the pans have entirely cleared the roller 35 and drop to the lower deck. The cross bars 19 are disposed at such spaced intervals that the lower and forwardly moving portions of the chains will not begin moving the pans forwardly of the device until the pans are discharged from the upper deck. In other words the distance between adjacent cross bars 19 is greater than the width of the pans 20.

The operation of the device is self-evident. Attention is called, however, to the operation of the rollers 33 and 34 upon the pans.

The roller 33 supports the rear ends of the pans as they move rearwardly, and as the pans leave the upper deck.

The sprockets are positioned to guide the cross bar or chain spreader bars 19 at the rear end of the trays at the time the trays are tipped. The trays are tipped in the following manner.

A tray 20 is carried beneath roller 340 and over roller 33. When the center of the tray reaches roller 33 the forward end would naturally tip downwardly and would interfere with the preceding tray if it were not for roller 340. Roller 340 holds the rear end of the tray so that the entire tray remains nearly horizontal until at least approximately two thirds of its width has passed over roller 33. At this time the rear end of the tray passes from beneath the roller 340 and the front end of the tray falls or drops to the lower deck. After the pans have been discharged from the upper deck 5, they are moved forwardly of the machine by the chain and cross bars, and are pushed forwardly over the table-like structure 6 at the forward end 30 of the device.

Motion may be imparted by any suitable means such as a pulley 40 carried by the shaft 14.

What I claim is:

1. In a device of the class described the combination of a pair of rails disposed in vertical relation one to another, the upper rail terminating intermediate the ends of the lower rail, endless chains extending adjacent the rails, detached trays for movement over the rails and adapted to fall from the upper rail to the lower rail upon reaching the end of the upper rail disposed intermediate the ends of the lower rail and spaced cross bars carried by the chains adapted to move trays in opposite directions on the rails.

2. In a device of the class described the combination of an upper and lower deck, the upper deck terminating intermediate the ends of the lower deck, sprockets mounted adjacent the ends of the lower deck, endless chains extending about the sprockets and passing over the decks in opposite directions, and spaced cross bars extending between the chains adapted to carry trays over the decks, and detached trays for entry between the chains and the adjacent cross bars and to drop from the upper deck to the lower deck on reaching the intermediate terminus of the upper deck.

3. In a device of the class described the combination of an upper and lower deck, the upper deck terminating intermediate the ends of the lower deck, sprockets mounted adjacent the ends of the lower deck, endless chains extending about the sprockets and passing over the decks in opposite directions, spaced cross bars extending between the chains adapted to carry trays over the decks, and detached trays for entry between the chains and the adjacent cross bars and to drop from the upper deck to the lower deck on reaching the intermediate terminus of the upper deck, and means to impart motion to the sprockets.

4. In a device of the class described the combination of an upper deck and a lower deck, the upper deck terminating intermediate the ends of the lower deck, and each deck comprising rails and tray supports extending longitudinally of the decks, shafts at the ends of the lower deck disposed in a plane substantially midway between and in parallelism with the decks, sprockets carried by the shafts, endless chains extending about the sprockets and riding upon the rails of the decks, cross bars extending between the chains adapted to move trays over the tray supports, a roller extending transversely of the decks and having its upper surface in substantial alignment with the uppermost portions of the tray supports of the upper deck, and spaced from the upper rail at a distance less than the width of a tray to be carried by the cross bars, and a second transverse roller disposed above the first mentioned roller and to the front thereof, the second mentioned roller having its lowermost face disposed in substantial alignment with the upper edges of trays disposed upon the upper deck, said two rollers co-operatively controlling tipping of a tray.

5. In a device of the class described the combination of an upper deck and a lower deck, the upper deck terminating intermediate the ends of the lower deck, and each deck comprising rails and tray supports extending longitudinally of the decks, shafts at the ends of the lower deck disposed in a plane substantially midway between and in parallelism with the decks, sprockets carried by the shafts, endless chains extending about the sprockets and riding upon the rails of the decks, cross bars extending between the chains adapted to move trays over the tray supports, a roller extending transversely of the decks and having its upper surface in substantial alignment with the uppermost portions of the tray supports of the upper deck, and spaced from the upper rail at a distance less than the width of a tray to be carried by the cross bars, a second transverse roller disposed above the first mentioned roller and to the front thereof, the second mentioned roller having its lowermost face disposed in substantial horizontal alignment with the upper edges of trays disposed upon the upper deck, means to impart motion to the sprockets, and means to drive the rollers from the endless chains.

6. In a device of the class described the combination of superposed decks, shafts and sprockets at the ends of the decks, endless chains extending over the sprockets and supported intermediate the sprockets by the decks, the upper deck terminating intermediate the ends of a lower deck, means carried by the chains for moving trays over the decks, and means for inclining the chains at the one end of the upper deck whereby to retain the tray moving means in operative engagement upon the trays until the tray is discharged from the upper deck upon the lower deck.

7. In a device of the class described the combination of superposed decks, revoluble sprockets at the ends of the decks, the upper deck terminating at one end intermediate the ends of the lower deck, endless chains extending about the sprockets supported by the decks, detached trays slidably engaging the decks and for movement over the decks, means carried by the chains for moving trays over the decks, means at the mentioned one end of the upper deck for retaining a tray in substantial alignment with its line of movement over the upper deck while the major portion of the tray is projected beyond the upper deck, and means for retaining the tray moving means in operative engagement upon trays until moved beyond the retaining means.

8. In a device of the class described the combination of a table, detached trays for slidably engaging the table for movement thereover, means to move trays over said table, a second table upon which trays are discharged from the first table, and means to preclude discharge of a tray from the first mentioned table until the major portion of the tray is projected beyond the first mentioned table.

9. In a device of the class described the combination of a table, detached trays for slidably engaging the table for movement thereover means to move trays over said table, a second table upon which trays are discharged from the first table, means to preclude discharge of a tray from the first mentioned table until the major portion of the tray is projected beyond the first mentioned table, and means for retaining the tray moving means in operative engagement upon the tray until the tray is discharged from the first mentioned table.

10. In a device of the class described the combination of a table, detached trays for slidably engaging the table for movement thereover means to move trays over said table, a second table upon which trays are discharged from the first mentioned table, and means for retaining the tray moving means in operative engagement upon a tray until the tray is discharged from the first mentioned table.

11. In a device of the class described the combination of a table, detached trays for slidably engaging the table for movement thereover means to move trays over said table, a second table upon which trays are discharged from the first mentioned table, and means for retaining the tray moving means in operative engagement upon a tray until the tray is discharged from the first mentioned table, the tray moving means being adapted to move trays over the second mentioned table after discharge of the trays from the first mentioned table.

12. In a device of the class described the combination of an upper deck and a lower deck, detached trays for movement over the decks, the upper deck terminating intermediate the ends of the lower deck whereby a tray on reaching the end of the upper deck will fall to the lower deck, each deck comprising rails and tray supports extending longitudinally of the decks, shafts at the ends of the lower deck disposed in a plane substantially midway between, and in parallelism with the decks, sprockets carried by the shafts, endless chains extending about the sprockets and riding upon the rails of the decks, and cross bars extending between the chains and adapted to move the trays over the tray supports.

In testimony whereof, I have hereunto subscribed my name this 1st day of December, 1922.

JOEL MOORES.